(No Model.)
A. WOOD.
SHAFT CENTERING LATHE.
No. 291,456. Patented Jan. 1, 1884.
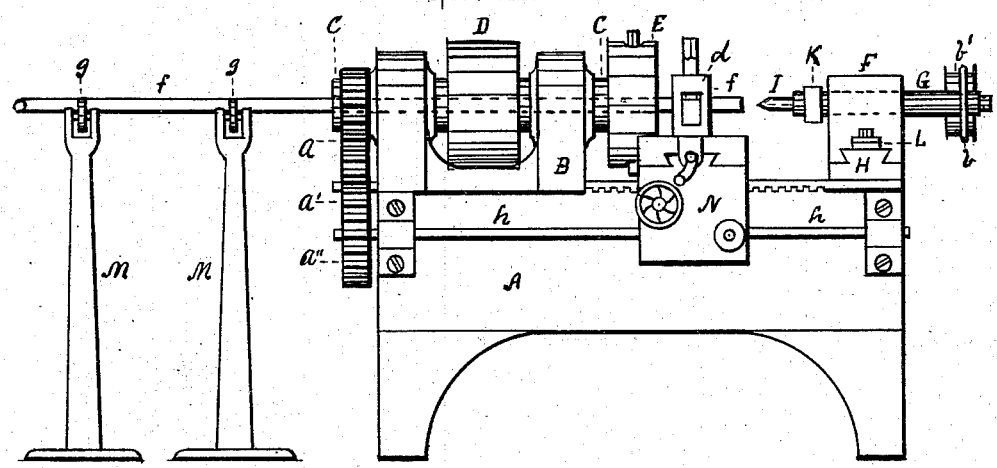
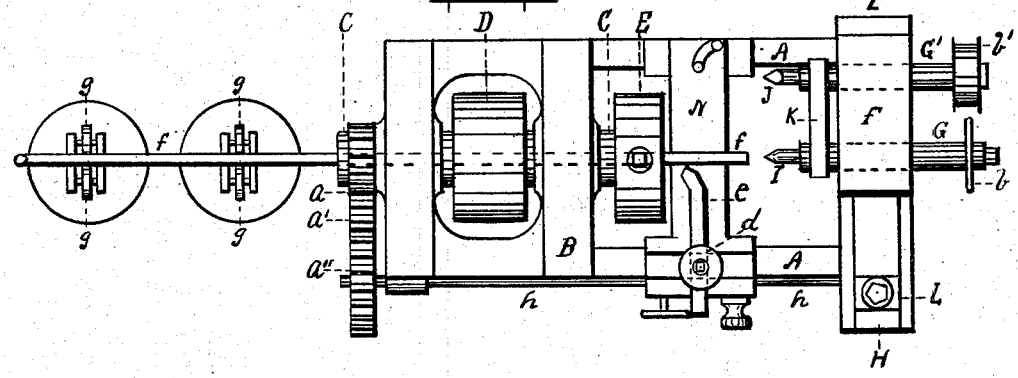
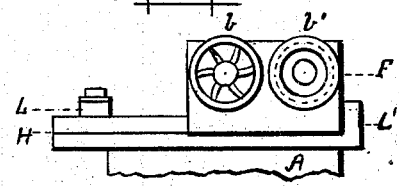
Witnesses:
Rufus B. Fowler.
H. M. Fowler.
Inventor:
Anson Wood.

UNITED STATES PATENT OFFICE.

AURIN WOOD, OF WORCESTER, MASSACHUSETTS.

SHAFT-CENTERING LATHE.

SPECIFICATION forming part of Letters Patent No. 291,456, dated January 1, 1884.

Application filed December 22, 1882. (No model.)

*To all whom it may concern:*

Be it known that I, AURIN WOOD, a citizen of the United States, residing at Worcester, in the county of Worcester and State of Massachusetts, have invented a new and useful Improvement in Shaft-Centering Lathes, of which the following is a specification.

My invention relates to a combined lathe and centering device, and has for its object to provide facilities for centering and turning the end of a piece of shafting in the same machine, as a part of the preliminary process in my improved mode of manufacturing metal shafting.

My invention is illustrated in the accompanying drawings, in which Figure 1 shows a front elevation of my improved shaft-centering lathe; Fig. 2, a plan view of the same, and Fig. 3 an end view of the tail-stock F.

Similar letters refer to similar parts in the several figures.

A is the bed; B, the head-stock, with hollow spindle C, driving-pulley D, and chuck E.

F is the tail-stock, with spindle G. The tail-stock rests on the transverse slide H, and carries, in addition to the spindle G and center I, the rotating spindle G', with its drill J and driving-pulley b'. Through the gear-wheels a, a', and a'' motion is imparted to the feed-shaft h h, by which the slide-tool rest N is made to traverse the lathe-bed carrying the tool-holder d and cutting-tool e. At suitable distances from the lathe, upon posts M M or other suitable supports, I place the friction-pulleys g g, arranged in pairs, for the purpose of sustaining in the proper position the shaft f f to be centered and turned. The end of the shaft f f is passed through the hollow spindle C till its end projects through the chuck E the distance required to be turned. The shaft is firmly grasped by the jaws of the chuck E, so that the rotary motion of the spindle C shall be imparted to the shaft f f, and the end of the shaft is adjusted, by means of the jaws of the chuck, so that its center shall correspond with the axis of the hollow spindle C. The tail-stock is drawn toward the front of the lathe, sliding on the transverse bed H until it strikes the stop L, which is so placed as to allow the spindle G', with the drill J, to come in line with the center of the end of the shaft f f. The drill is then advanced toward the shaft f by the hand-wheel b, which, operating to advance the spindle G in the same manner as the spindle is acted upon in an ordinary lathe, at the same time advances the spindle G' by means of the yoke or bar K, uniting the two spindles. Rotary motion is imparted to the spindle G', and the drill J is advanced, boring a small recess in the end of the shaft. The drill is then withdrawn and the tail-stock F pushed toward the back of the lathe until stopped by the projection L', which is so placed as to allow the spindle G, with its center I, to come in line with the recessed center of the shaft. The spindle G and center I are then advanced to support the end of the shaft, which, being rotated by the chuck E, is turned by the cutting-tool e. The tail-stock F slides transversely on the bed H, and the bed H also slides upon the lathe-bed, being held in its proper position by any of the well-known and commonly-used devices for the purpose.

I do not claim the use of a tail-stock capable of a transverse movement, for such has been before used and is a common construction of the ordinary turning-lathe to permit a tapering shaft to be turned; neither do I claim the combination, with a tail-stock, of a stationary drill-holding spindle; but What I do claim as my invention, and desire to secure by Letters Patent, is—

1. The combination, in a turning-lathe, with head-stock B, spindle C, tail-stock F, and spindle G, of the rotating drill-holding spindle G', as described, and for the purposes set forth.

2. The combination, with the tail-stock of a turning-lathe, of a rotating drill-holding spindle and suitable connected means for operating the same, as and for the purposes set forth.

3. The combination, in a turning-lathe, of the tail-stock F, spindle G, rotating drill-spindle G', and connecting yoke or bar K, as and for the purposes set forth.

4. The combination, in a turning-lathe, of the transversely-sliding tail-stock F, spindle G, rotating spindle G', and the stops L and L', as described, and for the purposes set forth.

5. The combination, with a shaft-centering lathe, of one or more pairs of anti-friction pulleys, the pulleys of each pair overlapping each other and being arranged in proper position with reference to the lathe, so as to allow the shaft while being centered to rotate upon the peripheries of the pulleys, as and for the purpose set forth.

AURIN WOOD.

Witnesses:
R. B. FOWLER,
H. M. FOWLER.